Sept. 14, 1954

A. M. SKELLETT 2,689,301

ARRANGEMENT FOR STORING INTELLIGENCE
SIGNALS ELECTRONICALLY

Filed Oct. 31, 1947

INVENTOR.
ALBERT M. SKELLETT
BY
*John J. Rogan*
ATTORNEY

Sept. 14, 1954         A. M. SKELLETT                 2,689,301
           ARRANGEMENT FOR STORING INTELLIGENCE
                   SIGNALS ELECTRONICALLY
Filed Oct. 31, 1947                              2 Sheets-Sheet 2
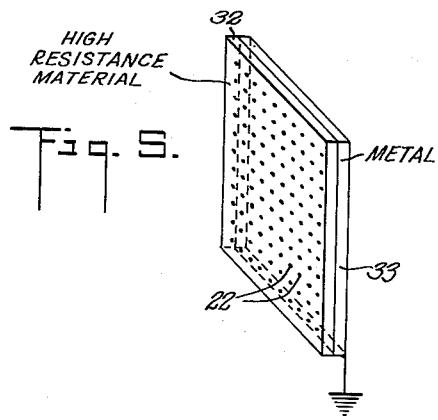
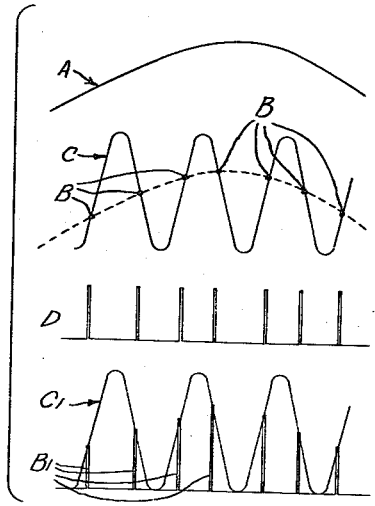
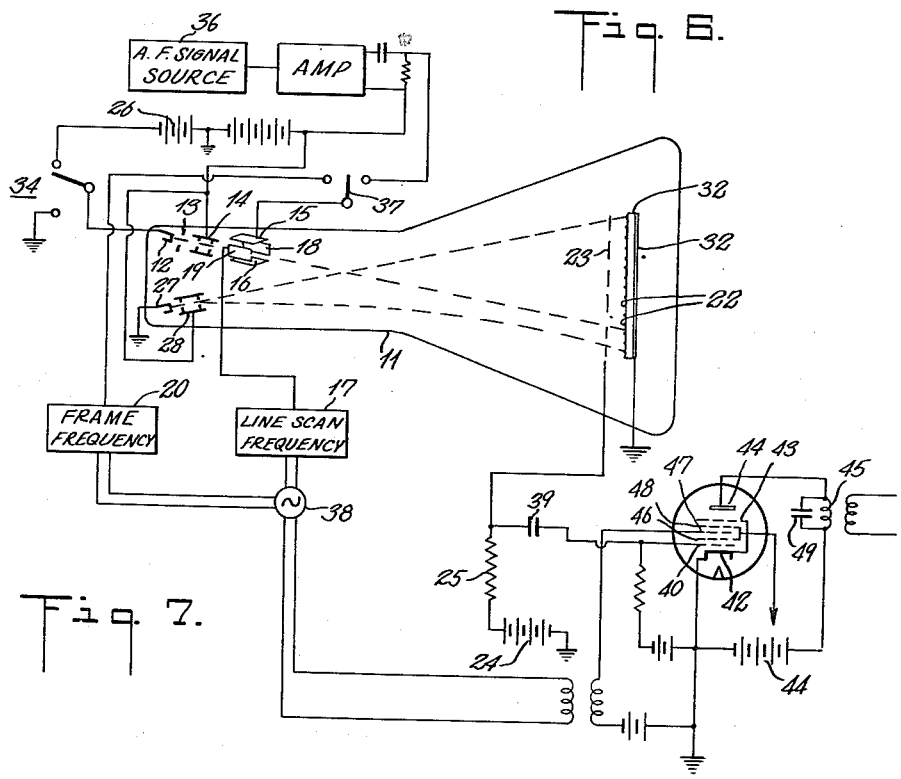
INVENTOR.
ALBERT M. SKELLETT
BY
John J. Logan
ATTORNEY Patented Sept. 14, 1954

2,689,301

UNITED STATES PATENT OFFICE 2,689,301

ARRANGEMENT FOR STORING INTELLIGENCE SIGNALS ELECTRONICALLY

Albert M. Skellett, Madison, N. J., assignor to National Union Radio Corporation, Newark, N. J., a corporation of Delaware Application October 31, 1947, Serial No. 783,272

7 Claims. (Cl. 250—27)

This invention relates to electron tube arrangements and more particularly it relates to arrangements for storing intelligence signals electronically.

A principal object of the invention is to provide an arrangement for electronically storing electric signals over a comparatively long time.

Another object is to provide an electronic intelligence storing tube which can be used to reproduce the intelligence a great number of times without materially destroying the original electronic record.

Another object is to provide an electronic storage tube which is particularly suitable in electronic comparators for comparing intelligence signals previously stored electronically, with the same intelligence subsequently produced, to determine differences between the original and reproduced records.

There has arisen in the past several years, the need for a device which is capable of electronically storing electric impulses in the form of patterns, which can be later compared with a similar series of impulses derived from another source to determine the accuracy of operation of said other source. Thus in the computing machine fields and the like, there has arisen a need for an electronic device in which a pattern of "on" and "off" signals such as a series of time spaced pulses may be electronically stored for a comparatively great length of time. This electronically stored record can then be compared at very high speeds with the results of a computation made by the machine to determine the accuracy of such computations which process can be repeated until the machine produces a computation which does not deviate from the stored pattern. Heretofore, this general procedure has been accomplished mechanically or electromechanically. However, such mechanical or electromechanical storage and comparison methods are not suitable for the requirements in certain specialized fields.

Accordingly, it is another principal object of this invention to provide an electronic tube arrangement by which it is possible to store a pattern of electric impulses at any desired speed, to produce a substantially enduring electronic record thereof, which pattern can be reproduced electronically at any desired speed without affecting the stored pattern. When desired, the original stored pattern can be wiped out electronically, to permit storing of a new pattern in its place. It will be understood that the expression "pattern" is used herein in a generic sense and is intended to include recording of any kind of intelligence signals.

It has been known for a comparatively long time in the television art that an optical image or picture can be converted into an electronic image, which however has a rather limited degree of persistency determined by the electrical leakage of the surface upon which the image is produced. Thus where the image is stored as an electrostatic image on a dielectric plate, or on a series of discrete mosaic dielectric areas, the duration of the image is definitely limited by the dielectric leakage current from the surface or mosaic.

Accordingly, it is another object of this invention to produce an electronic image on a surface, in conjunction with means to maintain such image for a length of time beyond that at which the image would normally leak off as a result of the conductivity or leakage properties of the surface on which the image is recorded.

A feature of the invention relates to an electron tube for storing intelligence signals and having a secondary electron-emissive storage target, in conjunction with two sources of bombarding electrons. One source is intelligence-modulated to produce an electronic image of the intelligence on the target and the other source is unmodulated but is capable of maintaining the previously stored intelligence on the target.

Another feature relates to an electron tube for storing intelligence signals having a secondary emission storage target and a pair of electron guns for developing separate electron streams, one of which is intelligence-modulated to select and set up one of two stable positive potential "floating" conditions at the target, and the other of which maintains the said selected stable "floating" condition even after the first electron stream has been cut off.

Another feature relates to an intelligence-signal storing tube of the electron image producing type, and having a pair of electron guns one of which is signal-modulated and having a common secondary emissive dielectric target and a common intervening electron accelerating grid, the cathodes of the two guns being normally biased to different potentials with respect to the target so that one gun acts to produce an electron image of the signals and the other gun acts as a maintaining device for the electron image.

A further feature relates to an electronic image storing tube having a plurality of electron guns for developing respectively an image-producing electron stream and an image-maintaining electron stream, both guns cooperating with a series of metallic targets to be bombarded successively by the electron stream from one gun and continuously by the electron stream from the other gun, the surface of the targets facing the streams being treated to render them efficient secondary electron emitters. The cathodes of the two guns are biased respectively to different potentials with respect to ground so that the image-producing gun determines which one of two stable positive floating potentials are to exist on the successive targets, while the image-maintaining gun maintains the previous floating condition as determined by the image-producing gun.

Another feature relates to a novel electronic method and apparatus for producing a predetermined phase delay between original signals and the signals reproduced therefrom.

A further feature relates to a novel electronic method of producing reverberation or echo effects in the reproduction of audio frequency waves.

A still further feature relates to the novel organization, arrangement, and relative interconnection of parts which cooperate to provide an improved electronic signal storage system.

Other features and advantages not specifically enumerated will be apparent after a consideration of the following detailed descriptions and the appended claims.

In the drawing which represents by way of example certain preferred embodiments.

Fig. 5 shows a modification of the storage screen of Fig. 3.

Fig. 6 is a series of graphs explanatory of one manner of using the invention to produce phase delay or artificial reverberation effects.

Fig. 7 is a schematic wiring diagram of the phase delay or reverberation system according to the invention.

Figure 1:
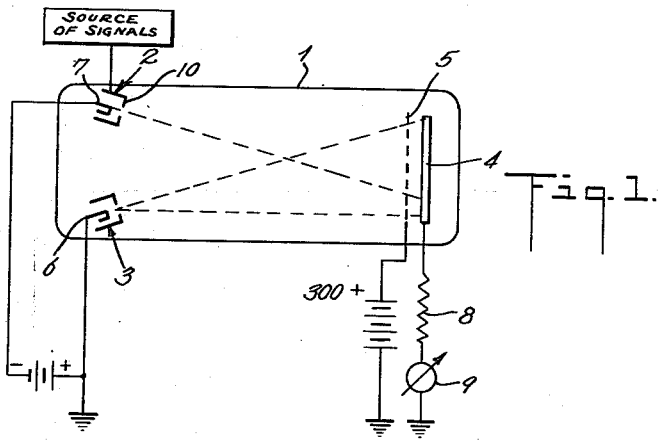
Fig. 1 is a schematic diagram of a tube and associated circuits for producing and maintaining an electronic image of an electric signal condition according to the invention.
Figure 2:
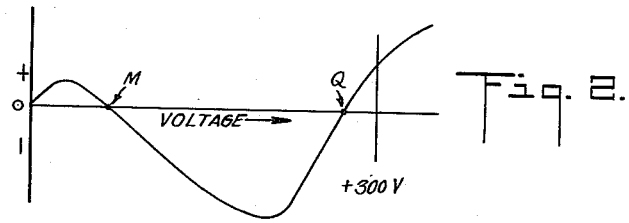
Fig. 2 is a graph which is explanatory of the operation of the tube of Fig. 1.

Referring to Figs. 1 and 2, an explanation will now be given of the fundamental basis upon which the present invention is predicated. Fig. 1 shows an evacuated bulb or tube 1 having mounted adjacent one end, a pair of electron guns 2, 3, in such a way as to develop respective electron streams directed toward the target 4. Located between the guns and the target, and closely adjacent to the target is a metal grid-like electrode 5. The guns 2 and 3 may be of any well-known construction such as is commonly used in the cathode-ray tube art. The gun 2 is provided with a control electrode 10, whereby the electron stream from gun 2 can be modulated or interrupted in accordance with intelligence signal voltages applied to the grid 10. However, the gun 3 is arranged so as to bombard the target 4 with a continuous stream of electrons. Target 4 on the side facing the guns has a coating of a secondary-electron emissive material of any well-known type, such for example as magnesium oxide which emits secondary electrons when bombarded by primary electrons from the guns. The grid 5 is maintained at a suitable high direct current potential, for example positive 300 volts direct current with respect to ground or with respect to other zero or equivalent base potential. The cathode 6 of gun 3 is connected to this ground or base potential. The cathode 7 of gun 2 is maintained at a suitable minimum negative potential with respect to ground as will be explained hereinbelow. The target 4 can be connected to ground or zero potential through a very high resistance 8 in series with a current indicator such as a microammeter 9. In effect therefore, the tube 1 is a dynatron having two separate electron sources, but the cathode of one gun is biased to a different negative potential as compared with the biasing of the cathode of the other gun with respect to the target. As is well-known in dynatron action, the amount of secondary emission that is obtainable from target 4 is a function of the energy or electron velocity of the primary electrons with which it is bombarded. Fig. 2 shows a graph of the current to and from the target 4 as the electron energy expressed in volts is varied from zero value up to a value in excess of the 300 volts applied to grid 5. For electron velocities between zero and M volts, the current flowing through meter 9 is positive. Likewise for electron velocities above Q volts, the current flowing through meter 9 is positive. As the electron velocity varies between M and Q volts, the current becomes negative. When the current is positive it is predominately carried by the primary electrons flowing from the guns to the target; when the current is negative, the number of secondary electrons leaving the target surface exceeds the number of primary electrons arrived there at from the guns. The two points M and Q are of particular interest in connection with the present invention. At point M, the slope or rate of change of the current is of negative sign and represents an unstable floating potential condition for the target 4. If both cathodes 6 and 7 are held at ground potential, while they are bombarding the target 4, and if a potential represented by the value Q (Fig. 2) is applied to target 4 and then this potential is disconnected from the target, the target will continue to stay at the same positive potential Q so long as the electron stream from either gun impinges on it. In fact, it is only necessary to apply to target 4 a momentary positive direct current potential which is greater than the value M to cause the target to jump immediately upon the said disconnection of the potential, to the value Q where it will continue to float in a stable manner. Thus there are two stable values of floating potential for the target 4, one at ground or very close to ground potential e. g., $-\frac{1}{2}$ volt to $-1$ volt, and one at the high positive floating potential represented by the value Q, and at these values the ratio of the number of primary electrons arriving at the target, to the number of secondary electrons leaving the target, is substantially unity.

In accordance with one phase of the invention, the gun 2 is used to control the particular one of the two stable conditions to be selected for the target 4, and the gun 3 is used to maintain this particular stable condition even after the electrons from gun 2 have been stopped. For this purpose, gun 2 has a control electrode 10 which is connected to a suitable intelligence signal source so as to control the cutoff of the electron streams from gun 2 before it strikes the target 4. Since the cathode of gun 3 is at zero or ground potential, should the electron stream from gun 3 be interrupted at the same time that the stream from gun 2 is interrupted, the target 4 would drop immediately from Q potential to zero or ground potential.

Since the function of gun 2 is to determine at which one of the two stable potentials, zero or Q the target is to float, it is necessary to bias the cathode of gun 2 negatively with respect to ground by an amount greater than the numeral value M, so that the electrons leaving the gun 2 will strike the target 4 with an electron velocity, expressed in volts, greater than that represented by the value M. Should the signal voltage on grid 10 be such as to permit these electrons to strike target 4, they will immediately cause the target to jump in potential to the value Q. The target will then continue to be held at this potential either by the electrons from gun 2, or if these electrons are cut off, by the electrons from gun 3. Since the gun 3 continuously sprays the target with electrons having an electron velocity equal to the instantaneous voltage of the target, the potential of target 4 will remain at the value Q. In other words, the stream from gun 3 maintains the previously stored electron image on the target 4, as determined by the modulation or interruption of the stream from gun 2. It has been found that the stable floating potential condition of the target 4 remains for a great length of time at the value Q, so long as it is continuously sprayed by the electrons from gun 3.

Figure 3:
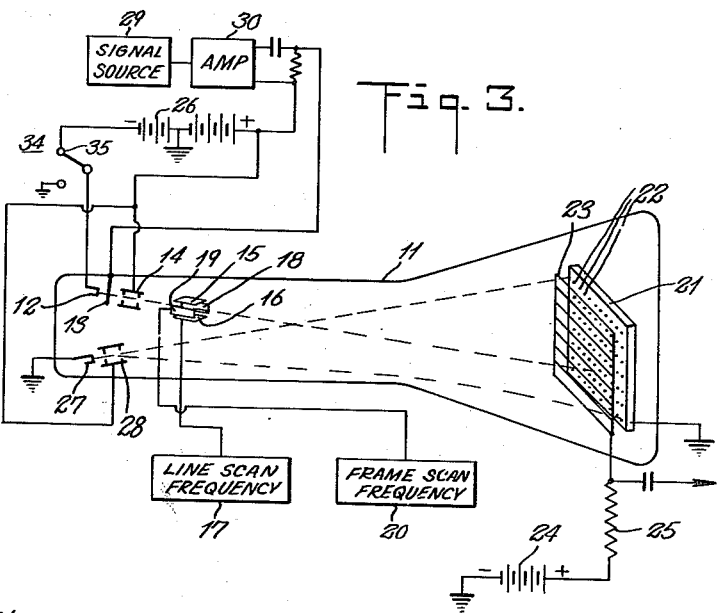
Fig. 3 is a composite structural and schematic wiring diagram of a multi-target image storing tube according to the invention.

Referring to Fig. 3, there is shown a pulse storing tube embodying the principles of the tube of Fig. 1. In this figure, the tube comprises an evacuated envelope 11 having suitably mounted at one end thereof a pair of electron guns. One of these guns comprises the electron-emitting cathode 12, the control grid 13, and the beam focussing anode or anodes 14 for focussing the electron stream from the cathode 12 into a beam of small cross section. This beam is arranged to be deflected in coordinate directions or in any other suitable scanning pattern by any well-known beam-deflecting arrangements. Thus, as schematically illustrated in Fig. 3, the deflector plates 15, 16, are supplied with the necessary deflecting potentials from a suitable line frequency source 17, such as is commonly used in the cathode-ray tube oscilloscope or television arts. Likewise, the deflector plates 18 and 19 are energized with the appropriate deflecting voltages from the frame frequency source 20. Located at the opposite end of the tube is a sheet or plate 21 of semi-conducting material or preferably it consists of a layer of semi-conducting material attached to a grounded metal backing plate as illustrated in Fig. 5. The surface of 21 facing the electron beam is provided with a series of minute targets 22 in the form of secondary electron-emissive material such for example as magnesium oxide on magnesium. With this arrangement, the secondary emission targets are direct current connected to ground by a very high resistance and they derive their floating potentials under control of the bombardment by the primary electrons as described above.

Located in adjacent spaced relation to the targets 22, is the wire grid electrode 23, which is connected to a suitable positive direct current biasing potential as schematically represented by the negatively grounded battery 24. For example, the grid 23 may be biased with respect to ground to a positive potential of approximately 300 volts direct current in series with a suitable resistance 25. As shown in Fig. 3, the cathode 12 is biased negatively with respect to ground, for example by battery 26, to a potential which is greater than the value M (Fig. 2). Consequently, the electrons which strike the targets 22, have an electron velocity greater than M, thus causing each target to assume its stable positive potential Q as soon as it is bombarded by the focussed beam from the scanning gun 12—13—14.

Figure 4:
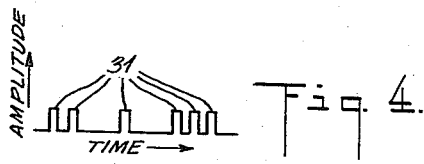
Fig. 4 is a graph explanatory of the operation of the tube of Fig. 3.

Also mounted at the left-hand end of the tube 11 is another electron gun comprising the electron-emitting cathode 27 with a beam accelerating anode 28. This second gun is designed so that the beam from the anode 28 continuously sprays all the targets 22 at the same time. However the cathode 27, instead of being biased negatively with respect to ground, is returned directly to ground. As above described, the control grid 13 is connected to a suitable electric signal source 29 through a signal amplifier 30 so as to control the "on" and "off" condition of the focussed electron beam from the first gun 12—13—14. Assume for example that the signal applied to grid 13 is represented by a series of time spaced pulses as shown in Fig. 4. The rate of scanning across the targets 22 as determined by the source 17 can be adjusted so that the time duration of each of the signal pulses 31 can be equal to the scanning time of each of the targets 22, and therefore the application of the signal pulses to the grid 13 will result in the storing of an equivalent electronic or electric potential image on the respective targets 22. This electric image is maintained so long as the targets are being continuously sprayed by the electrons from the other gun 27—28.

Instead of mounting the targets 22 directly on a plate 21 of semi-conducting material as in Fig. 3, these targets, as illustrated in Fig. 5, can be applied to a plate 32 of insulating material which is attached to a backing plate 33 of metal which can be connected to ground so that there is effectively a very high resistance between each individual target 22 and ground.

As above described, as the focussed electron stream originating from cathode 12 scans the targets 22, and since the cathode 12 is at a negative voltage greater than the value M (Fig. 2), this scanning beam will lay down on the target array the desired pattern of pulses, and this pattern will be stored as a pattern of voltages so long as the electron beam from the other gun 27—28 sprays the targets. If it is desired to read off the stored pattern without disturbing it, then the cathode 12 can be returned directly to ground instead of to the negative potential above described. For this purpose, the cathode 12 can be connected through a single pole double throw switch 34 so that it can be returned to ground for reading purposes without changing the scanning action of the beam. As this beam scans the previously stored pattern, each time the beam strikes a target, a corresponding voltage will appear across the resistance 25 in series with the grid 23 and yet this scanning action will not disturb the recorded pattern on targets 22. If it is desired to eliminate the pattern on the targets 22, all that is necessary is to turn off the electron blast from the gun 27—28, which will result in the dropping of the potential of all the targets to ground so that a new pattern may be produced on these targets by closing switch 34 on to contact 35, while the focussed beam is scanning the targets and is being subjected to the signal voltages from source 29. For a more detailed description of the dual stable point operation of a secondary electron-emitting electrode, reference may be had to my prior patent No. 2,293,177.

While, in the foregoing, reference has been made to the storage of "on" and "off" signals, it will be understood that the invention is not limited thereto. Thus the targets 22 may be deposited as discrete elemental areas by processes well-known in the manufacture of mosaic screens for television pick-up tubes and the like, thus forming a mosaic of minute areas each of which can be separately bombarded and each of which is direct current insulated from the adjacent areas. With such a fine grained series of individual targets, it is possible to scan the target screen by a modulated scanning beam by applying video or picture signals to grid 13 to set up a complete potential or electronic image on the various target elements of the screen. This image is maintained, regardless of leakage, by the action of the auxiliary electron gun 27—28 as above described. Furthermore, by providing each of the discrete target areas with a fluorescent coating for example zinc-beryllium-silicate, it is possible to render the stored potential or electronic image visually observable. This feature is of great importance in certain fields of application particularly where the signals applied to grid 13 are in the nature of radar signals. In some instances, these signals are available only for a few thousandths of a second. Consequently, with the arrangement above described, it is possible to record the radar signals for any length of time. This feature is also important in so-called rotating radio beacons or direction-finding arrangements, wherein the beacon scan results in only a momentary signal pattern. By using the arrangement above described, this pattern can be maintained for any desired length of time after the beacon sweep has acted on the usual radio beacon sweep receiver, the signal detected output of which receiver is applied to the grid 13.

The invention is not limited to the recording of signals of any particular frequency range and it is clear that it can record voice frequency signals such as music or speech, or supersonic signals for long or short periods of time.

One of the additional uses to which the arrangement can be put is the storing of audio frequency signals for a very short interval to obtain a desired phase delay or to produce artificial reverberation of the reproduced signals. An arrangement for accomplishing this purpose is illustrated in Fig. 7. In this arrangement, the tube 11 and its various parts are identical with the tube 11 of Fig. 3. The audio frequency signals to be reverberated or phase delayed are applied from source 36 to the vertical deflector plates 15, 16, of the tube by way of the switch 37; the horizontal plates 18, 19, being energized at the line scan frequency derived from local oscillator 38, thus producing a scanning pattern as represented by the graph A (Fig. 6). Since the screen 21 is made up of a series of discrete secondary emission areas, this scanning pattern of the beam will leave a pattern of dots or charged areas on the mosaic screen as represented by the dotted graph B in Fig. 6. In order to reproduce this stored audio frequency signal, the switch 34 is operated to ground the cathode 12, and the plates 15, 16, will be disconnected from the source 36, for example by means of switch 37, so as to apply to these plates from source 38, a high frequency scanning wave of sine wave pattern as represented by the graph C (Fig. 6), it being understood that this scanning frequency is much higher than the highest audio frequency that is stored on the target screen. As a result of this scanning under control of the high frequency sine wave, a series of pulses D of equal amplitude appear across the resistor 25. The pulses D are applied through coupling condenser 39, to the first control grid 40 of a demodulator tube 41, which may be of the well-known pentagrid converter type, whose electron-emitting cathode 42 is connected to the suppressor grid 43 and whose anode 44 is connected to the direct current plate supply 44 through a suitable output network 45. The shield grids 46, 47, are connected to a suitable positive tap on the direct current supply 44 in the well-known manner. The second control grid 48 is supplied with the frequency from the source 38 as represented by the graph C1 (Fig. 6). By suitably biasing the grids 40 and 48, the output of the tube 41 is effectively pulsed by the pulses D. Thus at the instant each of the pulses D is applied to grid 40, current is allowed to flow to the second control grid 48 and the amount of current flowing to the plate 44 at that instant will be a function of the instantaneous amplitude of the wave C1 which is applied to grid 48. As a result, there appear in the output circuit of the tube 41 a series of pulses B1. By reason of the integrating action of the condenser 49 and the output coil 45, these pulses are smoothed to provided an output response substantially identical with the curve A of the original audio frequency signal.

A typical set of values for the various electrodes of the tube 11 are as follows. The metal backing plate 33 is at ground voltage; the grid 23 at +500 volts direct current; the accelerating voltages for the guns 12—14 and 27—28 +500 volts direct current; the cathode 12 at −90 volts D. C. with the switch 34 in "recording position".

While in the foregoing description reference has been made to the target electrode as assuming, under certain conditions, ground potential when bombarded by the gun 27—28, it will be understood that this target potential may vary between −½ volt and −1 volt.

While certain particular embodiments have been described herein, various changes and modifications may be made without departing from the spirit and scope of the invention.

By the expression "stable potential" as employed in the claims is meant the second of the two points, for example the point "Q" in Fig. 2 where the ratio of primary to secondary electrons at the target is substantially unity, said stable potential being substantially greater than zero and wherein the rate of change of the target current is positive for increasing velocities of the bombarding primary electrons.

What is claimed is:

1. A signal storage arrangement comprising a pair of electron guns to develop two separate electron streams, a member mounted for bombardment by said streams, means to signal modulate one stream while allowing the other stream to bombard said member continuously, said member having a surface which emits secondary electrons when bombarded with primary electrons from said stream, means responsive to one signal condition at said modulating means to cause the first stream to bombard said member so that it assumes a stable positive potential at which the ratio of primary to secondary electrons is substantially unity, the last-mentioned means being responsive to another signal condition to cause the first stream to bombard said member so that it assumes a stable potential lower than the first-mentioned stable potential and also at which the ratio of primary to secondary electrons is substantially unity, means to arrange the bombarding velocity of the electrons from the other stream to maintain said member at the stable potential which has been determined by the first stream, and means to interrupt said other stream to cause said member to assume ground potential.

2. A signal transmission arrangement comprising a cathode-ray tube having a bank of secondary electron-emissive targets, a pair of electron guns for bombarding said targets, one of said guns having means to focus the electrons into a scanning spot, means to move said scanning spot in a predetermined scanning pattern over the targets, means to signal modulate said beam to set up on said screen an electric potential record in the form of a wave whose envelope represents the original signals, means to cause the electrons from the other gun to maintain said record, means to cause the first beam to rescan said targets at a high frequency rate and with an electron velocity lower than that used for setting-up said record, an output circuit electrically coupled to said bank of targets to develop in response to said re-scan a series of sequential electric currents corresponding to the instantaneous amplitude of successive elements of the said wave envelope, and means to reconvert said series of electric currents into a reproduction of the original signals.

3. A signal storing and reading arrangement, comprising an evacuated envelope enclosing first and second electron guns each including an electron emission source, a grounded target to be bombarded by the electron streams from both guns, said target having a secondary electron emission surface, means to bias the emission source of the first gun negatively with respect to ground to cause said target to assume a stable positive potential at which the ratio of primary to secondary electron emission is substantially unity and at which the target current increases with increasing electron velocity from said first source, means to control the electrons from the first gun by applied signals to set up corresponding potential records on said target, and means to bias the emission source of the second gun less negatively with respect to ground to subject said target to a steady electron bombardment to maintain the said potential record thereon, an electron collector electrode adjacent said target, and means to move the electron stream from the first gun while maintaining the electron emission source of the first gun at ground potential to scan said target while maintaining the target under bombardment by the electron stream from the second gun to produce reading currents corresponding to the said potential record and without substantially changing said record.

4. A signal storage and reading arrangement according to claim 3 in which said target is connected to ground through a high resistance leakage path, and the emission source of the second gun in substantially at ground potential.

5. Signal transmission and reproducing apparatus, comprising a first electron beam having a predetermined electron velocity, means to move said beam in a point by point scanning sequence over a secondary electron emission surface, means to modulate said beam by electric signals to set up on said surface an electric potential record of the signals, means continuously bombarding the entire surface by another electron beam of lower electron velocity to maintain said record, means for causing said first beam to re-scan said record after a predetermined time delay and with a lower electron velocity than its said predetermined velocity but not less than the electron velocity of the second beam, an output circuit electrically coupled to said secondary emission surface to produce in response to said re-scan electric currents corresponding to said record without substantially affecting said record, and a signal reproducing device to which said currents are applied.

6. Cathode ray tube apparatus having a bank of secondary electron-emitting targets, means to develop a first electron stream of a predetermined minimum electron velocity to produce on said targets an electrical record of signals, means to develop a second electron stream of another predetermined minimum electron velocity which is less than the electron velocity of the first stream to maintain said record on said targets, means to cause the first stream of electrons to scan said targets point-by-point in a predetermined scanning pattern to set up said record, means to cause the other stream of electrons to simultaneously spray the targets to effect said record maintenance, and means to cause said first stream to re-scan the targets to produce output voltages corresponding to said signal record thereon without substantially affecting the permanency of said record, the last-mentioned means including means to lower the electron velocity of the first stream during said re-scan to a level not less than the electron velocity of said second stream.

7. Cathode ray tube apparatus according to claim 6, in which each of said stream developing means includes an electron-emitting cathode, and said last-mentioned means includes a positively-charged grid mounted in front of said bank of targets said grid being positively biassed with respect to both cathodes and returned to ground through a high resistance.

References Cited in the file of this patent

UNITED STATES PATENTS

| Number | Name | Date |
|---|---|---|
| 2,122,095 | Gabor | June 28, 1938 |
| 2,179,205 | Toulon | Nov. 7, 1939 |
| 2,260,911 | Knick et al. | Oct. 28, 1941 |
| 2,276,359 | Von Ardenne | Mar. 17, 1942 |
| 2,339,662 | Teal | Jan. 18, 1944 |
| 2,367,277 | Henroteau | Jan. 16, 1945 |